US007752172B2

(12) United States Patent
Boylan et al.

(10) Patent No.: US 7,752,172 B2
(45) Date of Patent: Jul. 6, 2010

(54) TRANSACTION PROCESSING

(75) Inventors: Jonathan Boylan, Dublin (IE); Rory Connolly, County Dublin (IE); Eoin Kirwan, Dublin (IE); Ann McCorry, County Cavan (IE); Alan Molloy, Dublin (IE)

(73) Assignee: Neos financial Systems Limited, Dublin (IE)

( * ) Notice: Subject to any disclaimer, the term of this patent is extended or adjusted under 35 U.S.C. 154(b) by 1445 days.

(21) Appl. No.: 11/085,550

(22) Filed: Mar. 22, 2005

(65) Prior Publication Data

US 2005/0166091 A1   Jul. 28, 2005

Related U.S. Application Data

(63) Continuation of application No. PCT/IE03/00127, filed on Sep. 23, 2003.

(30) Foreign Application Priority Data

Sep. 23, 2002  (IE)  ................................. 2002/0764
Sep. 23, 2002  (IE)  ................................. 2002/0769

(51) Int. Cl.
*G06F 7/00*  (2006.01)
(52) U.S. Cl. ...................... 707/648; 707/694
(58) Field of Classification Search .............. 707/104.1, 707/100, 10, 102
See application file for complete search history.

(56) References Cited

U.S. PATENT DOCUMENTS

| 4,819,159 | A | * | 4/1989 | Shipley et al. | ................. 714/19 |
| 5,220,665 | A | * | 6/1993 | Coyle et al. | ................. 718/101 |
| 5,706,506 | A | * | 1/1998 | Jensen et al. | ............ 707/103 R |
| 5,758,356 | A | * | 5/1998 | Hara et al. | ................... 707/202 |
| 5,893,911 | A | | 4/1999 | Piskiel et al. | ................. 707/10 |

(Continued)

FOREIGN PATENT DOCUMENTS

EP     0236743 B1    9/1987

(Continued)

OTHER PUBLICATIONS

Schmidt, Proc of 1994 Usenix Conf, pp. 1-17, XP002278968, ASX: an object-oriented framework for developing distributed . . . .

(Continued)

*Primary Examiner*—Hosain T Alam
*Assistant Examiner*—Leon Harper
(74) *Attorney, Agent, or Firm*—Jacobson Holman PLLC

(57) ABSTRACT

A processor (2) in a transaction processing system (1) has an event engine and a scenario engine. The event engine stores a framework (20) for each entity or type of service. The framework (20) has a parent class (21) and subsidiary classes (22-27). In real time the event engine instantiates an event object from a relevant class (22-27), giving it an effective time on a timeline of the parent class (21). The event objects many subsequently be handled as autonomous units for generation of reports or batch processing. The event engine moves the event objects between states of a finite state machine. A scenario engine also manipulates objects according to a finite state machine with future dates as the effective times. There is a state transition from the scenario environment to the event engine (live) environment.

11 Claims, 5 Drawing Sheets

U.S. PATENT DOCUMENTS

| | | | | |
|---|---|---|---|---|
| 5,907,673 | A | * | 5/1999 | Hirayama et al. ............. 714/16 |
| 6,014,647 | A | * | 1/2000 | Nizzari et al. ................. 705/39 |
| 6,185,577 | B1 | * | 2/2001 | Nainani et al. .............. 707/202 |
| 6,438,538 | B1 | * | 8/2002 | Goldring ........................ 707/3 |
| 6,622,152 | B1 | * | 9/2003 | Sinn et al. ................... 707/204 |
| 6,651,077 | B1 | * | 11/2003 | East et al. ................... 707/204 |
| 6,711,593 | B1 | * | 3/2004 | Gordon et al. .............. 707/204 |
| 7,236,967 | B2 | * | 6/2007 | Hogan ........................... 707/1 |
| 2001/0047273 | A1 | * | 11/2001 | Greer et al. .................... 705/1 |
| 2001/0056438 | A1 | * | 12/2001 | Ito .............................. 707/204 |
| 2002/0156792 | A1 | * | 10/2002 | Gombocz et al. ........... 707/100 |

FOREIGN PATENT DOCUMENTS

EP            0425415 B1    6/1998

OTHER PUBLICATIONS

Steiert et al, Nat'l Conf on Databases, Jul. 6-8, 1998, pp. 1-18 XP002278969, JPMO-an advanced persistent message queuing . . . .

* cited by examiner

TRANSACTION PROCESSING

This is a continuation of PCT/IE03/00127 filed Sep. 23, 2003 and published in English.

INTRODUCTION

1. Field of the Invention

The invention relates to operation of data processing systems in situations where multiple transactions are associated with a particular entity such as a financial contract or a manufacturing process.

2. Prior Art Discussion

For many years most transaction processing systems have included a large "back office" mainframe computer. Such a computer traditionally processes and records transaction data in a manner whereby it is tied directly to a business entity such as a user account. For example, a relational database primary table is for customer identification data, while rows of a lodgement table record lodgement data linked by keys to the associated rows of the customer table. When the system generates a customer statement it populates the document template with some data (e.g. name, address) from the customer table, and entry lines of transaction data retrieved from related transaction tables.

While this approach is efficient for particular operations, it lacks versatility. It is extremely complex to generate different reports based on sorting of data on criteria other than association with a primary record.

European Patent Specification No. EP0236743B1 describes a method for restarting a long-running, fault-tolerant LOAD operation in a transaction-oriented database system. Transaction oriented changes are written to a log and a sequential data set is maintained.

European Patent Specification No. EP0425415B1 describes an object management system in which database objects are stored in non-volatile storage. There is a work object class, having methods for creating an object, a start method for incrementing a unit of work instance current level by one, and a notify method for creating a database object. A rollback method destroys changes made for a current unit of work level by deleting copies of database objects and table pointers.

Such arrangements appears to allow greater flexibility than traditional relational database technology. However, there is still a need for greater versatility in transaction processing systems to meet the demands of customers and hosting organisations for rapid change of business entities and real time performance.

SUMMARY OF THE INVENTION

According to the invention there is provided a data processing system comprising a processor, a data storage device, a user interface, and a memory, the processor comprising an event engine storing an object class for each type of transaction for an entity, and the event engine instantiates a discrete event object from the object class for each transaction in real time.

In one embodiment the event engine stores a class framework comprising a hierarchical structure of object classes including a parent class acting as a container for all event classes associated with a particular entity.

In another embodiment the event engine automatically generates an effective time value for each event object as it is instantiated.

In a further embodiment the effective time value is the time for when the event first affects the associated entity.

In one embodiment the event engine automatically determines a modified effective time to ensure machine-level uniqueness of the effective times of all event objects for an entity, whereby events are executed in series.

In another embodiment the modification adds an extension to an initial effective time according to an event priority value.

In one embodiment the effective time value is at the granularity of a day period.

In another embodiment the event engine further comprises a batch function for monitoring status of the event objects.

In one embodiment the batch function rolls back events by processing multiple event objects according to their effective times.

In another embodiment the batch function groups events according to entity.

In a further embodiment the batch function performs rollback and rollforward by issuing rollback and rollforward instructions to event objects according to their effective times, and the instructed event objects generating outputs according to their methods in sequence.

In one embodiment the batch function inserts an event object into an entity at a time earlier than the current time, and determines the effect on the entity by rolling back to a time immediately before that of that event object and by rolling forward to the current time.

In another embodiment the batch function classifies events as either internal or external, and regenerates only internal events during a rollforward in which internal events are automatically triggered by the processor and external events are triggered by a user or external system.

In a further embodiment the effective time is with respect to a timeline of a parent event object, said timeline being an attribute of the parent event object.

In one embodiment the processor further comprises a scenario engine for sequencing processing of event objects in a rollforward queue in which effective times are in the future.

In another embodiment the scenario engine comprises a state-machine.

In a further embodiment a transition from a pending active state of the scenario finite state machine is to an active state for a finite state machine for a live environment.

In one embodiment the scenario state machine tags each event object having a proposed effective time so that they are kept separate from live event objects.

In another embodiment the event engine state machine implements a transition from active to pending rollback states and from active to pending rollforward states.

In a further embodiment the event engine finite state machine implements a transition from active to inactive.

In one embodiment the parent class includes common technical methods which are independent of transaction logic, and all other classes of an entity inherit said methods from the parent class.

In another embodiment said common technical methods include a method which determines whether it is allowable to include the object in a roll forward operation, and a method which determines whether it is allowable to include the objects in a roll back operation.

In a further embodiment said common technical methods include a method which comprises effective dates across objects for sequential processing in a correct order in roll forward or roll back.

According to another aspect of the invention there is provided a computer program product comprising software code for implementing operations of a transaction processing system of any preceding claim when executing on a digital computer.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

Figure 1:
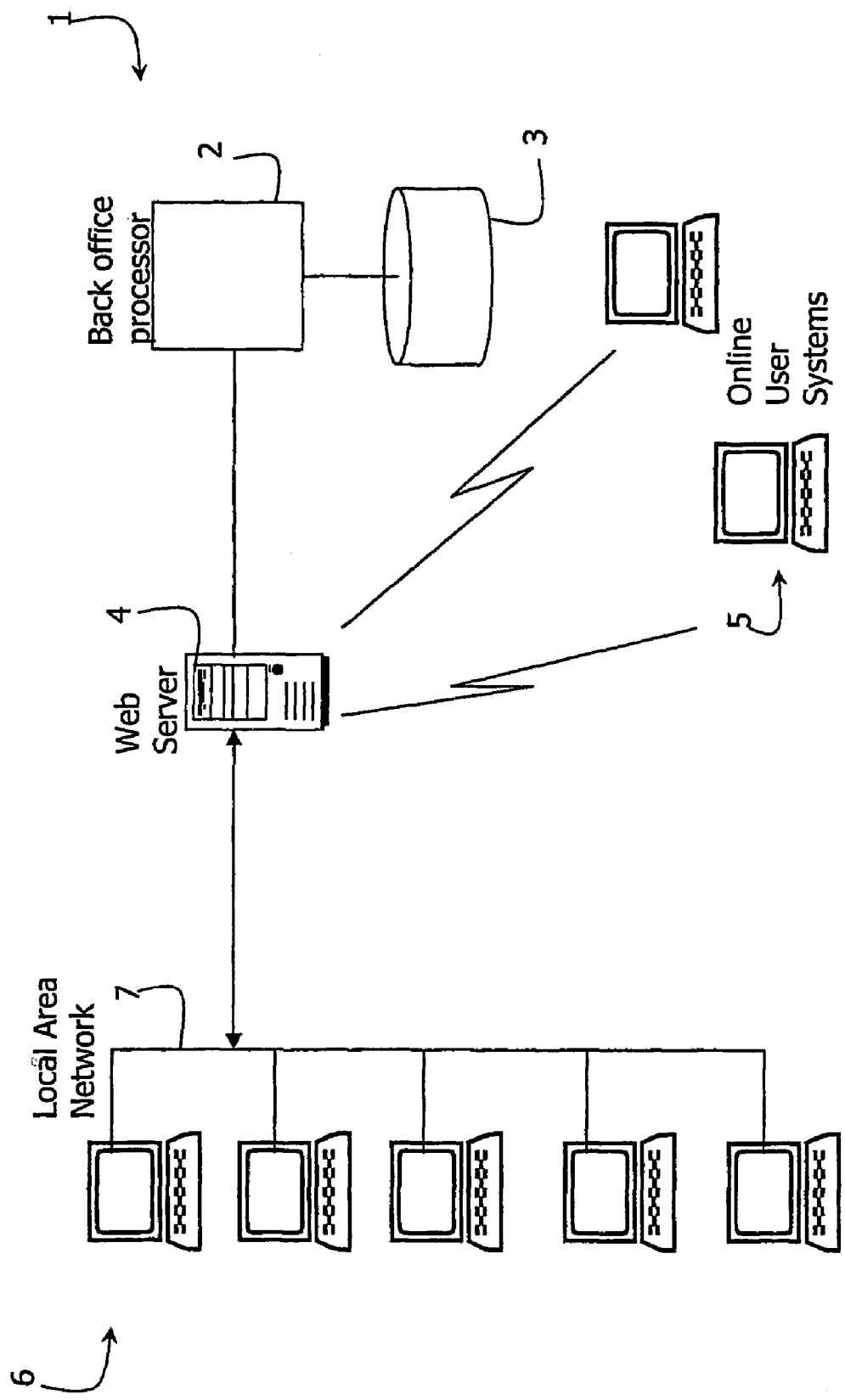
FIG. 1 is a high level block diagram showing a transaction processing system of the invention.

Referring to FIG. 1 a transaction processing system 1 comprises a back-office transaction processor 2 having a transaction database 3. A server 4 interfaces with the processor 2 to allow access to selected data by online users 5 and user systems 6 in a local area network (LAN) 7. At this level the system is conventional, and FIG. 1 omits detail such as multiple hardware units in a redundancy configuration and mirrored databases of the processor 2. However, the invention lies in the software architecture to achieve greater versatility for transaction processing, recording, and report generation using transaction data, without sacrificing real time performance.

Figure 2:
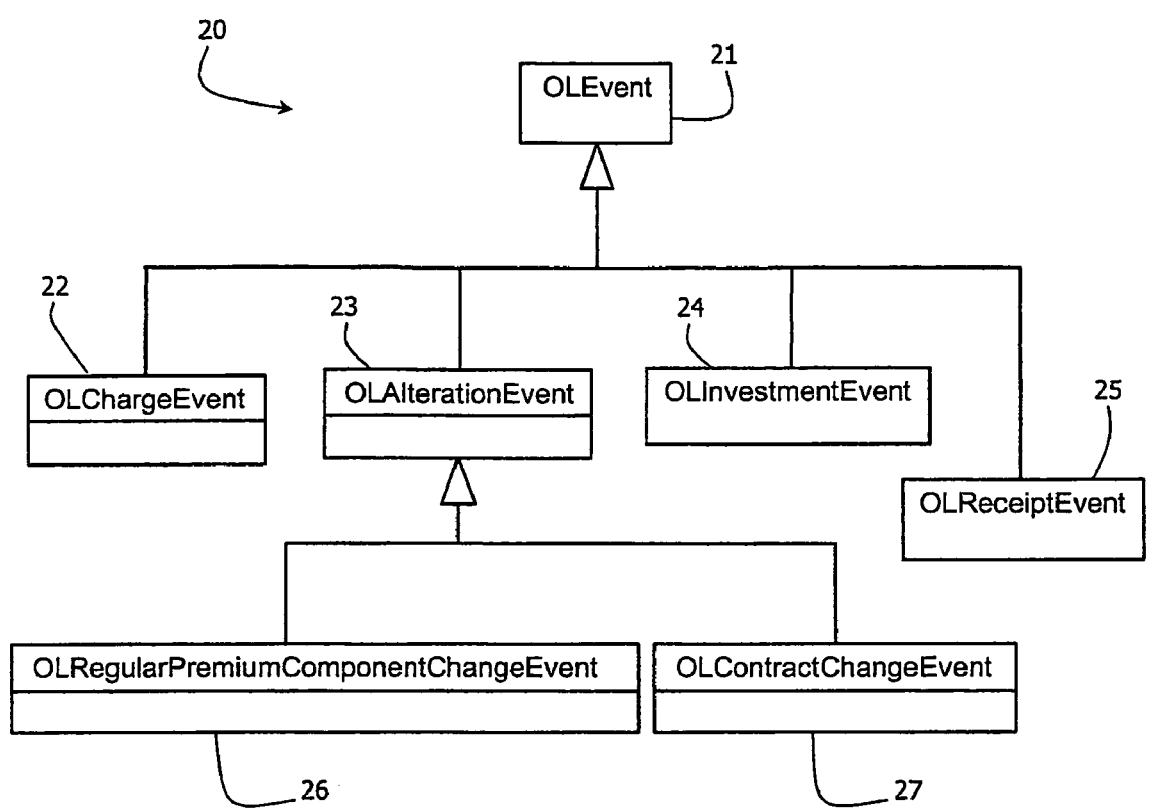
FIG. 2 is a diagram showing an event object hierarchy.

Referring to FIG. 2 the processor 2 has an event engine which stores at least one class framework 20 having a parent event class 21 for a particular entity such as a financial contract. The processor 2 automatically generates in real time a discrete event object for each transaction. In this example there are the following object classes linked to the parent event class 21:

- 22: charge event,
- 23: alteration event,
- 24: investment event,
- 25: receipt event,
- 26: regular premium component charge event,
- 27: contract charge event.

Thus, for each entity the event engine has a class framework. During real time processing the event engine determines the relevant framework and generates an object from the relevant class for each transaction. Thus, if an account holder changes address, the class 23 is used to instantiate a discrete object for that event. Likewise, a transaction for receipt of a payment causes an object to be generated from the class 25.

The event engine generates an event object irrespective of where the transaction originates from, such as user-initiated (e.g. contract modifications), or automated (e.g. monthly premium collection).

The event objects are discrete and can be individually executed for various online and offline operations. While they are discrete, their attributes associate them with the other event objects for the entity.

Figure 3:
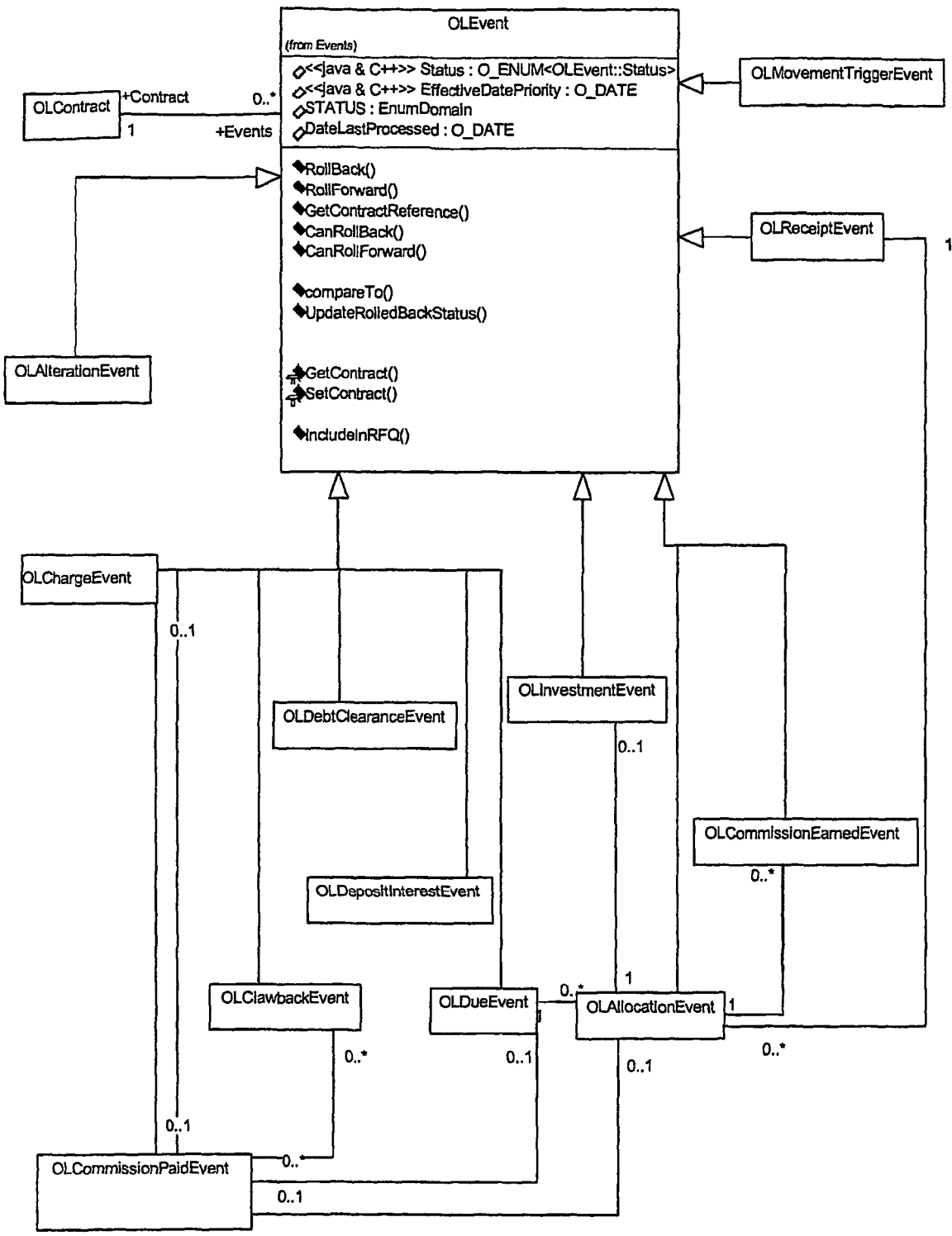
FIG. 3 is a diagram showing linking of event objects with their parent event object in more detail.

Referring to FIG. 3 the linking of classes to a parent class "OL Event" is shown in more detail. This diagram shows a set of common methods from "RollBack" to "InternalDelete" which are inherited by all of the event objects linked with that parent object. The additional methods in the event objects are specific to the transaction logic. The important common underlying technical methods are:

- Rollback( ). Rolling back to negate the transaction operations.
- RollForward( ). Applying the event to the entity.
- GetContractReference( ). All of the objects in a hierarchy for an entity have the same contract reference, and this code executes retrieval of that reference, which then links them together.
- CanRollBack( ). A flag or rule to determine whether the object can be rolled back. Objects for non-system generated activities often can not be rolled back.
- CanRollForward( ). A flag or rule to determine whether the object can be rolled forward. Again, typically dependent on whether external inputs or triggers are required.
- compareTo( ). This method compares effective times across objects, thus allowing autonomous sequencing in the correct order.
- UpdateRolledBackStatus( ). This notifies the event engine core of the rolled back status.
- GetContract( ). This retrieves the unique contract reference.
- SetContract( ). This changes a contract reference, which only occurs under certain conditions.
- Include in RFQ( ). This determines if the object can be included in a roll forward queue (RFQ) for a simulation. A simulation is not a projection or hypothetical scenario, because it is based on events which are confidently predicted to happen rather than hypothetical possibilities.

These methods allow the individual objects to execute the underlying technical functionality without the event engine core needing to directly handle such functionality. Thus, extension or modification of an entity involves only modifying the framework. If the modification is to add a transaction, the event engine simply adds a class which will inherit the common technical methods above and will also include its specific methods and attributes for the transaction.

Each event object is automatically accorded an effective date by the event engine, being the date at the start of which the event affects the contract. This is determined by the transaction logic of the event object as it is instantiated.

A problem could arise from different objects having the same effective time. While this may be satisfactory at the business level, at machine level they must be executed in sequence. Thus, the event engine automatically appends a time period to the effective time according to a priority value. Each class has a priority value attribute, and the event object appends a time value to the initial effective time to give a final effective time for sequential operation of the events.

Event objects can be instantiated by user actions (e.g. alterations to contract data), automatically by date (e.g. regular charges, premium dues which are required to occur on particular regular dates), or automatically by other events (e.g. a premium allocation event triggers an investment event). Date-based internal events are scheduled (created and assigned an effective date) by their predecessors.

The group of event objects for an entity has a timeline reference from commencement date until its termination date. The timeline is an attribute of the parent object instantiated from the class 21. The timeline is a collection of event effective times, with each event's location on the timeline given by its effective time and priority. Central ownership of the timeline is thus provided in that, even though the event's processing may actually be carried out in different systems, the management of what needs to be processed when (and all the related sequencing and scheduling and back-dating processing) is controlled by the event engine.

Because all object processing operates in effective time with reference to the timelines and because internal events re-generate themselves through time, processing can be run into the future to simulate the actual future of the contract. This enables projections to be made for business purposes such as premium quotations.

The event engine executes a batch process or daemon in which events for processing are selected and grouped by contract, and loads them into a dynamic "roll forward queue", where they are processed in order. The first step in such processing is to roll back to the effective date of the earliest outstanding event. A rollback instruction is invoked on each event in this interval. Because this procedure is followed for all processing, back-dating is routine and does not require user intervention. Thus, it is possible to insert an event into the timeline in the past and this will simply cause the intervening events to be rolled back.

The queue is dynamic because event objects have the logic in their methods to create triggered events and add them to the queue.

Each event object has a status and state transitions are governed by an event state machine. The path of an event through the state machine depends on whether it is "external" or "internal". External events are those which are the system's representation of some real world action such as the receipt of money or a customer's request to alter the contract in some way on a particular date. The processor 2 does not have the authority to undo these events, but must step over them when rolling back. They are fixed on the timeline. Internal events (such as clock-triggered automatic events) are entirely controlled by the processor 2 and can be undone in rollback. Replacement internal events are created in the rollforward phase and all relevant calculations applied again.

State transitions for the event state machine are described in more detail below with reference to FIG. 5.

It will be appreciated that the event object processing allows the processor 2 to be used both for the real time processing of contracts or for projections (e.g. premium reviews, quotations). This provides accuracy and the ability to project all administrative options and product features without any duplication of code. Also, automatic control of scheduling and sequencing of events is achieved without user intervention.

New event classes can be added without changing the core event engine logic. This allows excellent flexibility for allowing the processor 2 to be quickly configured for handling a fresh type of contract. All of the structures of event classes are stored in a library for fast retrieval.

Processing occurs at business entity (contract), rather than processing type, level so that (a) contracts can be selected for processing individually and (b) a contract is always fully processed up to a given date.

The processor centrally monitors the timeline, which is linked with all of the associated event objects by their attributes and effective times.

Also, the processor provides a full audit trail because records, once created, are not overwritten, changed or deleted. State machine control is particularly suitable for logging records.

The discrete nature of the event objects and their interlinking provides a framework for managing the complexity which arises in contracts when some parameters change through time and there is ongoing processing at increment, as opposed to cumulative, level. This increment-based processing helps to provide a fast response time for real time transaction processing.

There is no requirement to re-process historic alterations in order to arrive at the increment position. The increment position is constantly maintained through a combination of sequence numbers and states.

The processor 2 also handles hypothetical scenarios for reasons such as mortgage quotations or projections of manufacturing line throughput in a very versatile manner.

Figure 4:
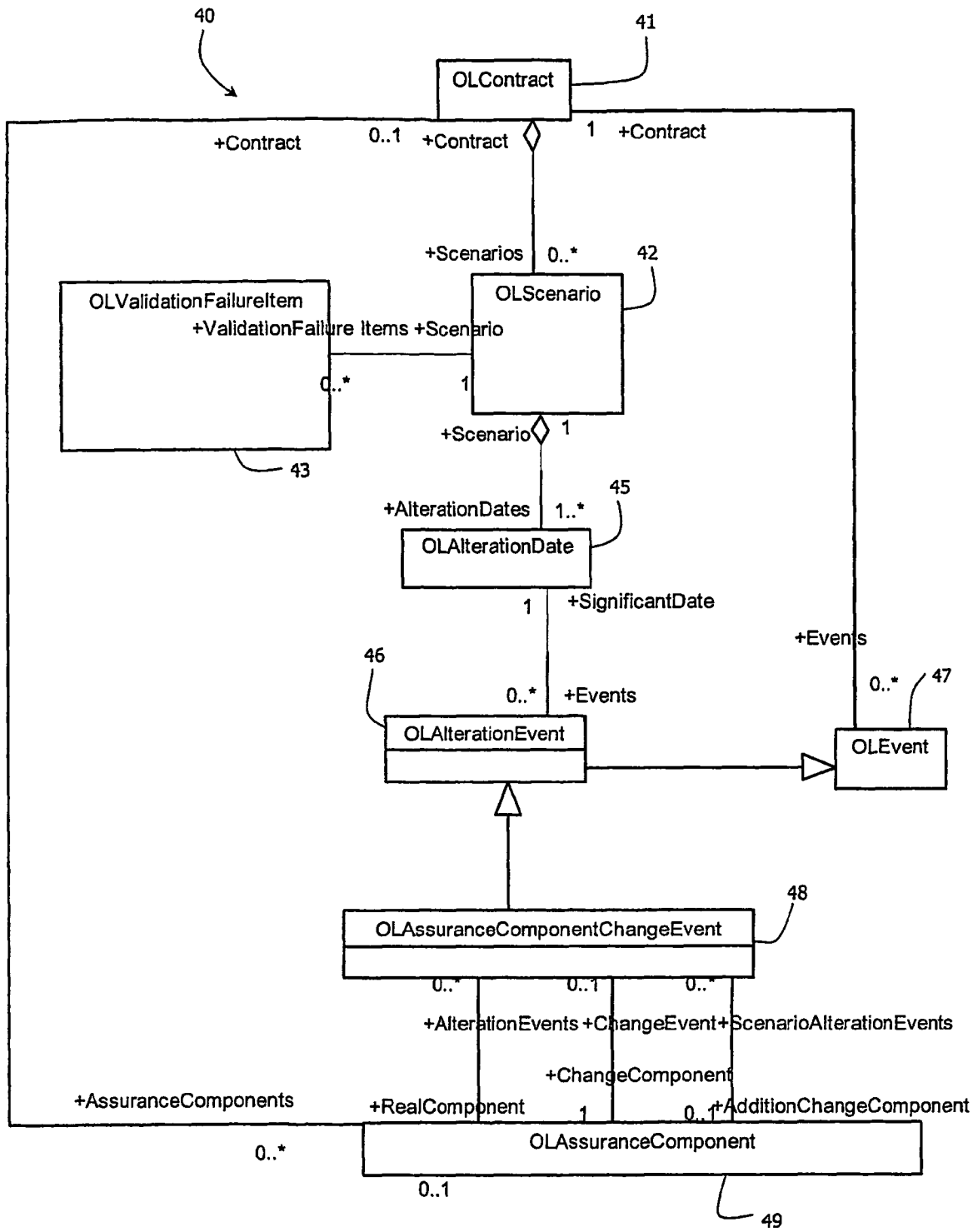
FIG. 4 is a diagram showing how the system processes scenario prediction.

Referring to FIG. 4 an entity or contract class 41 has a scenario sub-class 42. There are also classes for validation (43), alteration dates (45), alteration events (46), events (47), component change event (48), and assurance component (49). These classes are not concerned with individual events, but with alteration and scenario handling for an entity such as a contract.

A scenario object is instantiated to represent one set of potential modifications which will either be confirmed or discarded as a unit. An alteration event within a scenario represents one or many modifications at a single point in time to a component of a contract. The word "contract" is used to cover any process which involves ongoing performance of transactions. In the examples above financial contract examples are given. However it may alternatively be a manufacturing process in which completion of products through workstations are treated as transactions. For example, filling of a food container is treated in real time as a transaction event for which an event object is generated. The process or contract is executed by rules governing such things as quality control procedures for a manufacturing process or insurance policy rules for an insurance contract. The word "component" is used to mean a discrete set of rules, for a process stage or aspect, such as filling a container with a nozzle or calculating interest payments.

A scenario object is a container for events projected forward in a scenario. This progression is managed by a scenario state machine, which controls the actions available at any given stage. The state machine determines if the scenario needs expert attention from a higher-level user or if it can be progressed directly. Also, it determines if there are error messages (e.g. limits exceeded or data omissions) which inhibit progression.

Figure 5:
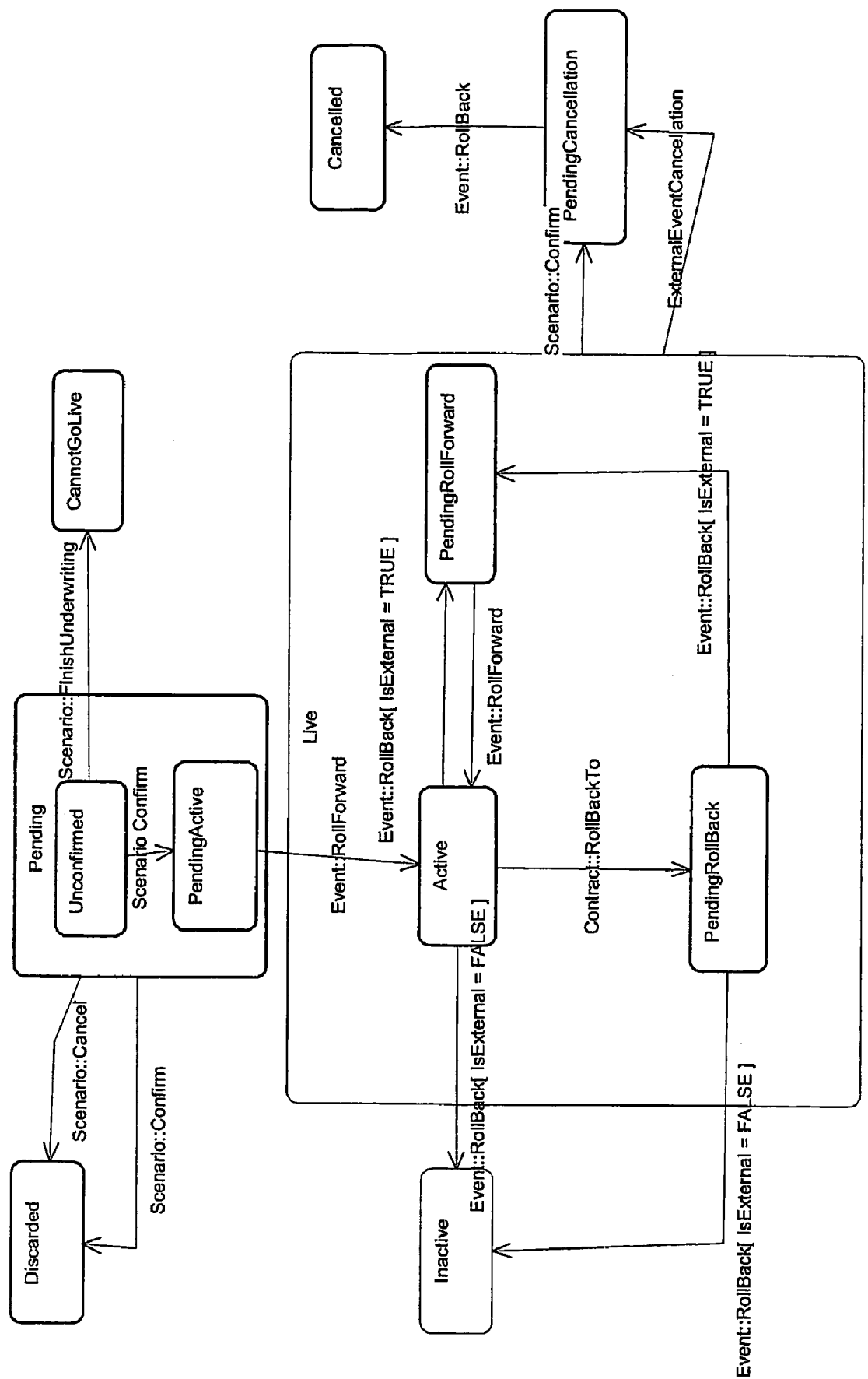
FIG. 5 is an event state transition diagram.

Referring to FIG. 5 the processing of objects is shown in a state transition diagram. The states for live transaction processing by the event engine are:

active,
pending rollback,
pending rollforward,
inactive,
pending cancellation, and
cancelled.

As shown at the top of the diagram, scenarios are processed separately by a scenario engine implementing a scenario state machine. The states are:

unconfirmed pending,
pending active, and
discarded.

The transition from "pending active" in the scenario environment is to the "active" state in the live environment.

In creating alterations the processor creates new versions of event sequences and generates displays so that it is visually intuitive. The user selects an alteration date and the system generates a static snapshot of all the events as at that date (based on alterations from other confirmed scenarios or on proposed alterations within the same scenario). The user selects an edit action, and the processor constructs the new version.

This detachment of the set of proposed changes from the real data enables scenarios to store details of hypothetical changes. It is possible to have multiple scenarios open at the same time on a contract. The scenarios are independent and the real components do not know anything about them until (at most) one of the scenarios is selected for confirmation.

There are no restrictions on the effective dates that may be chosen for alterations (which can be additions, edits or removals). They can be in the future or in the past.

If a new alteration is being created on a particular real component with a date earlier than a previously confirmed alteration, whether or not that alteration has already been processed, then the processor 2 identifies where the later alteration will be invalidated if the current alteration is confirmed. This is notified to the user and automatically effected upon confirmation of the scenario. In this way the framework handles "clashing" alterations for example a premium increase is being proposed where there is a later dated premium decrease.

The invention is not limited to the embodiments described but may be varied in construction and detail.

The invention claimed is:

1. A data processing system comprising:
   a processor,
   a data storage device,
   a user interface,
   a memory,
   the processor comprising an event engine storing an object class for each type of transaction for an entity, and
   the event engine instantiates a discrete event object having object software code methods from the object class for each transaction in real time;
   wherein the event engine stores a class framework comprising a hierarchical structure of object classes including a parent class acting as a container for all event classes associated with a particular entity;
   wherein the event engine automatically generates an effective time value for each event object as it is instantiated;
   wherein said effective time value is the time for when the event first affects the associated entity;
   wherein the event engine automatically determines a modified effective time to ensure machine-level uniqueness of the effective times of all event objects for an entity, whereby events are executed in series;
   wherein said modification adds an extension to an initial effective time according to an event priority value;
   wherein the event engine further comprises a batch function for monitoring status of the event objects;
   wherein the batch function rolls back events by processing multiple event objects according to their effective times;
   wherein the batch function groups events according to entity;
   wherein the batch function performs rollback and rollforward by issuing rollback and rollforward instructions to event objects according to their effective times, and the instructed event objects generate outputs according to their software code methods in sequence;
   wherein the batch function inserts an event object into an entity with an effective time earlier than the current time and determines the effect on the entity by rolling back to a time immediately before the effective time of that event object and by rolling forward to the current time;
   wherein the batch function classifies events as either internal or external and regenerates only internal events during a rollforward in which internal events are automatically triggered by the processor and external events are triggered by a user or external system;
   wherein the event engine automatically generates an effective time value for each event object as it is instantiated, and wherein the effective time is with respect to a timeline of a parent event object, said timeline being an attribute of the parent event object;
   wherein the scenario engine comprises a state machine; and
   wherein the scenario state machine tags each event object having a proposed effective time so that they are kept separate from live event objects.

2. The system as claimed in claim 1, wherein the effective time value is at the granularity of a day period.

3. The system as claimed in claim 1, wherein the event engine automatically generates an effective time value for each event object as it is instantiated, and wherein the effective time is with respect to a timeline of a parent event object, said timeline being an attribute of the parent event object, and wherein the processor further comprises a scenario engine for sequencing processing of event objects in a rollforward queue in which effective times are in the future.

4. The system as claimed in claim 3, wherein the scenario engine comprises a state machine.

5. The system as claimed in claim 3, wherein the scenario engine comprises a state machine, and wherein a transition from a pending active state of the scenario finite state machine is to an active state for a finite state machine for a live environment.

6. The system as claimed in claim 5, wherein the event engine state machine implements a transition from active to pending rollback states and from active to pending rollforward states.

7. The system as claimed in claim 6, wherein the event engine finite state machine implements a transition from active to inactive.

8. The system as claimed in claim 1, wherein the event engine stores a class framework comprising a hierarchical structure of object classes including a parent class acting as a container for all event classes associated with a particular entity, and wherein the parent class includes common technical methods which are independent of transaction logic, and all other classes of an entity inherit said methods from the parent class.

9. The system as claimed in claim 8, wherein said common technical methods include a method which determines whether it is allowable to include the object in a roll forward operation, and a method which determines whether it is allowable to include the objects in a roll back operation.

10. The system as claimed in claim 8, wherein said common technical methods include a method which comprises effective dates across objects for sequential processing in a correct order in roll forward or roll back.

11. A computer program product comprising a computer-readable storage medium having computer-executable software code for implementing operations of a transaction processing system of claim 1 when executing on a digital computer.

* * * * *